United States Patent [19]

Koizumi

[11] Patent Number: 4,504,145
[45] Date of Patent: Mar. 12, 1985

[54] APPARATUS CAPABLE OF MEASUREMENT OF PROFILE OF EMISSION LINE SPECTRUM

[75] Inventor: Hideaki Koizumi, Tokyo, Japan

[73] Assignee: Hitachi, Ltd., Tokyo, Japan

[21] Appl. No.: 411,370

[22] Filed: Aug. 25, 1982

[30] Foreign Application Priority Data

Aug. 28, 1981 [JP] Japan .................................. 56-134167

[51] Int. Cl.³ .............................................. G01J 3/00
[52] U.S. Cl. ..................................... 356/300; 356/368
[58] Field of Search ........................ 356/300, 311, 368

[56] References Cited

FOREIGN PATENT DOCUMENTS 918878 2/1963 United Kingdom .

OTHER PUBLICATIONS van Heek, *Spectrochimica Acta*, vol. 25B, No. 2, Feb. 1970, pp. 107–109.

*Primary Examiner*—F. L. Evans
*Attorney, Agent, or Firm*—Antonelli, Terry & Wands

[57] ABSTRACT

Light from a light source emitting a line spectrum is passed through an absorbing cell. A metal element is enclosed in the absorbing cell, and the temperature of the absorbing cell is controlled to maintain a predetermined atomic vapor pressure of the metal element. This absorbing cell is disposed in the gap between the poles of an electromagnet. A linear polarizer is disposed between the light source and the absorbing cell. Light passed through the absorbing cell is led via a spectroscope toward a light sensor. While the light is being directed from the light source toward the absorbing cell, the value of current supplied to the electromagnet is changed to vary the intensity of the magnetic field. With the field intensity variation, the wavelength of a component split from the absorption line of the atomic vapor in the absorbing cell is shifted. This wavelength-shifted component is scanned along the wavelength of the line spectrum emitted from the light source, whereby the profile of the emission line spectrum can be measured.

9 Claims, 5 Drawing Figures

APPARATUS CAPABLE OF MEASUREMENT OF PROFILE OF EMISSION LINE SPECTRUM

BACKGROUND OF THE INVENTION

This invention relates to an apparatus capable of measuring the profile of a line spectrum emitted from a light source, and more particularly to an apparatus of the kind above described which can measure such a profile with high resolution.

A Fabry-Perot interferometer has heretofore been used for the spectrophotometry with very high resolution. However, it has been difficult to use the Fabry-Perot interferometer for the spectrophotometry of an emission having a wavelength smaller than 300 nm, and it has been utterly impossible to use the interferometer for the spectrophotometry of an emission having a wavelength smaller than 250 nm, since the reflection efficiency of the etalon becomes extremely low at short wavelengths. The spectrophotometry with very high resolution is especially indispensable for the measurement of the profile of emission line spectrums of atoms. It is commonly known that, in most of the chemical elements, the atom's primary resonance line widely utilized for the spectroscopic analysis of the elements lies within the wavelength range of from 170 nm to 300 nm, and, in view of such short wavelengths, the Fabry-Perot interferometer is not suitable for the purpose. It is the established fact that the profile of the line spectrum emitted from a light source of atomic spectrum is the principal factor which determines the sensitivity of absorption and the linearity of calibration curves in the field of atomic absorption analysis too. In spite of the above fact, the profile of the emission line spectrum of most of the elements has still been a matter of assumption due to the difficulty or impossibility of measurement. While hollow cathode lamps are now widely used in the field of atomic absorption analysis, it is the present status that the emission spectrum profile is not measured so frequently.

SUMMARY OF THE INVENTION

It is an object of the present invention to provide an apparatus which is capable of determining the profile of an emission line spectrum to be measured even when such a spectrum lies in the ultraviolet range.

Another object of the present invention is to provide an apparatus which is capable of measuring the profile of the emission line spectrum with resolution higher than that of the Fabry-Perot interferometer.

According to the present invention, a magnetic field is applied to atomic vapor producing an absorption line of specific wavelength, and the intensity of the magnetic field is varied so that the wavelength of a component split from the absorption line is shifted depending on the varied intensity of the magnetic field. The emission line is absorbed at the wavelength of the shifted component when passing through the atomic vapor. As the wavelength of the shifted component is varied, the emission line spectrum is scanned along the wavelength of the profile thereof with variation of the shifted component. Thus, the profile of the emission line spectrum can be measured when the intensity of transmitted light or the absorbance is calculated as a function of the intensity of the magnetic field.

The present invention thus utilizes the fact that the width in wavelength of an absorption line is smaller than the width of the profile of an emission line spectrum. The present invention differs entirely from the prior art manner of spectrophotometry on an emission line spectrum and utilizes the inverse Zeeman effect on an absorption line. The method according to the present invention is called the inverse Zeeman scanning to distinguish it from the prior art spectrophotometry.

DESCRIPTION OF THE PREFERRED EMBODIMENTS

Figure 1:
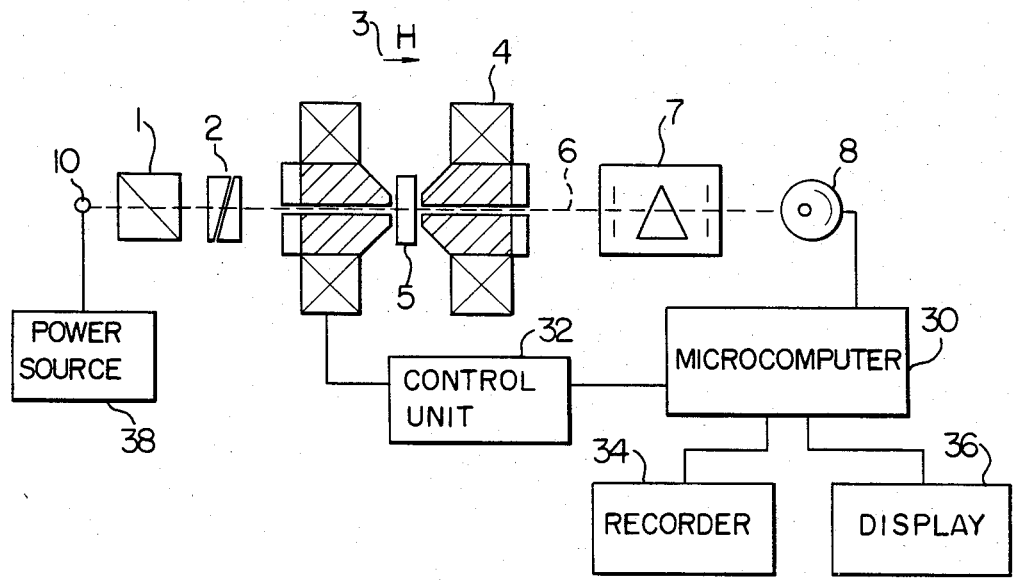
FIG. 1 shows schematically the structure of a preferred embodiment of the apparatus according to the present invention.

FIG. 1 shows schematically the structure of a preferred embodiment of the apparatus of the present invention in which the longitudinal inverse Zeeman effect is utilized for profile measurement. Referring to FIG. 1, light emitted from a light source 10 of an atomic line spectrum which is the object of measurement passes through a linear polarizer 1, so that linearly polarized light is selectively derived from the linear polarizer 1. A phase-shifting plate i.e. wave plate 2 shifts the phase of incident light by a half-wave of its wavelength thereby converting the linearly polarized light into circularly polarized light. Right circularly polarized light is derived from the wave plate 2 when the optical axis of the wave plate 2 makes an angle of +45° with that of the linear polarizer 1. On the other hand, left circularly polarized light is derived from the wave plate 2 when its optical axis makes an angle of −45° with that of the polarizer 1. An absorbing cell 5 is disposed in the gap between the poles of an electromagnet 4 having an axial through-hole permitting transmission of light therethrough.

Figure 2:
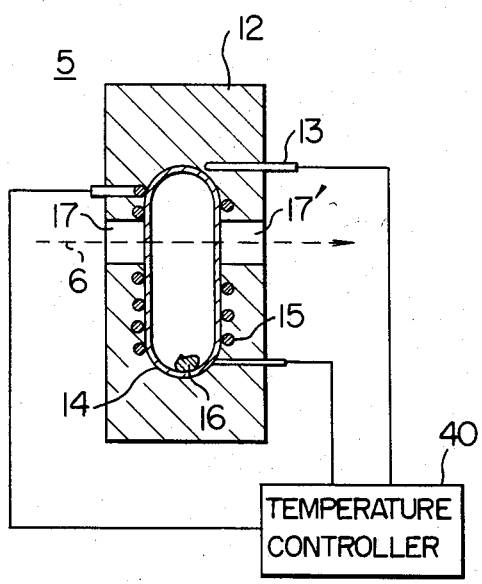
FIG. 2 is a schematic sectional view of the absorbing cell disposed in the magnetic field in FIG. 1.

The detailed structure of the absorbing cell 5 will be described with reference to FIG. 2. Referring to FIG. 2, a chemical element producing an absorption spectrum line whose wavelength is substantially the same as that of the corresponding line in the emission spectrum is enclosed in a small quantity in a tubular cell 14 of quartz. This element is preferably a metal, and zinc is enclosed in the quartz cell 14 in this embodiment. An inert rare gas such as argon (Ar) or neon (Ne) is enclosed within the cell 14 at a pressure of about 2 Torr. The quartz cell 14 is surrounded by a heater 15 and a heat insulator 12. The heater 15 surrounding the quartz cell 14 is energized to heat the cell 14 up to a predetermined temperature to emit atomic vapor at a predetermined vapor pressure from the metal enclosed in the cell 14. The vapor pressure of the atomic vapor is generally selected to be $10^{-5}$ to $10^{-3}$ Torr. In order that the vapor pressure of the atomic vapor can be maintained constant, a thermocouple 13 senses the temperature of the quartz cell 14, and the output of the thermocouple 13 is applied to a temperature controller 40 which controls the power supplied to the heater 15. The light beam 6 passes through aligned windows 17 and 17' of the quartz cell 14.

Referring to FIG. 1, this absorbing cell 5 is disposed in the gap between the poles of the electromagnet 4 establishing a magnetic field 3, and the wavelength of the absorption line of the atomic vapor is shifted by the inverse Zeeman effect depending on the intensity of the magnetic field 3 produced by the electromagnet 4. A monochromator 7 is provided for separating the objective atomic line in the light beam 6 from other lines and it may be a conventional one having a low resolution of the order of 1 nm. A light sensor 8 senses the intensity of light appearing from the spectroscope 7.

A variety of light sources 10 are exchangeably or replaceably provided. A single light source may be detachably mounted at the position of the light source 10, or one of a plurality of light sources arranged on a rotary member may be positioned at the predetermined location. The light source 10 is energized by a power source 38. The electrical signal from the light sensor 8 is arithmetically processed in a microcomputer 30 according to an equation $A = -\log T$, where T indicates the transmission factor determined by the light detected by the sensor 8 and A indicates the absorbance. The resultant absorbance A is recorded on a recorder 34. Further, the absorbance corresponding to the intensity of magnetic field 3 may be displayed on a display unit 36. Under command of the microcomputer 30, a control unit 32 controls the current supplied to the electromagnet 4 so that the current value can be changed with time. While the light from the light source 10 is being directed toward the absorbing cell 5, the intensity of the magnetic field 3 is continuously or stepwise varied so as to shift the position of the wavelength of a component split from the absorption line. The emission line spectrum is scanned along the wavelength of its spectrum with variation of the shifted component so that the profile of the emission line spectrum can be depicted on the recorder 34.

The profile measurement will be described in further detail with reference to the measurement of the profile of an emission line spectrum from a hollow cathode lamp of zinc (Zn), by way of example. In the case of Zn, the temperature level for heating the absorbing cell 5 is set at a constant value in the vicinity of 150° C. Since the wavelength of the primary resonance line of Zn is 213.9 nm, the monochromator 7 is set at the wavelength of 213.9 nm. The resonance line of Zn exhibits the normal Zeeman effect. Therefore, when the magnetic field is applied to the atomic vapor of Zn, wavelength-shifted $\sigma^+$ and $\sigma^-$ components are split from the absorption line. Thus, when the aforementioned circularly polarized light is passed through the atomic vapor of Zn in a direction parallel to the magnetic field, the right-handed circularly polarized light is absorbed by the $\sigma^+$ component only, and the left-handed circularly polarized light is absorbed by the $\sigma^-$ component only by the inverse Zeeman effect. The relation between the intensity H of the magnetic field and the shifted amount $\nu_s(H)$ of the wavelength of the $\sigma^+$ and $\sigma^-$ components is linear as shown in the following expression:

$$\nu_s(H)_{(GHz)} = 1.4 \cdot H_{(KG)} \tag{1}$$

The intensity of the magnetic field 3 is varied by varying the level of the current supplied to the electromagnet 4. The wavelength is shifted correspondingly. Thus, the transmittance of the light passed through the absorbing cell 5 is measured as a function of the intensity of the magnetic field. It has been found that, when the width of the emission line spectrum is sufficiently larger than that of the absorption line, the profile of the emission line spectrum can be accurately determined by merely subjecting the measured transmittance to logarithmic transformation.

Figure 3:
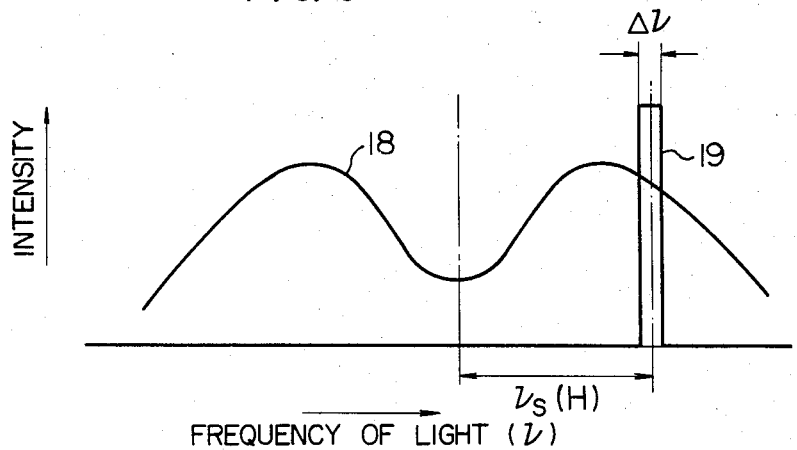
FIG. 3 shows the relation between the emission line spectrum from the light source and the component split from the absorption line in FIG. 1.

Referring to FIG. 3, the profile of the emission line spectrum 18 is expressed as a function $f(\nu)$ of the frequency $\nu$ of light. The wavelength of the $\sigma$ component is shifted by $\nu_s(H)$ under influence of the magnetic field whose intensity is H, and the profile of the $\sigma$ component 19 of the absorption line is expressed as $g(\nu - \nu_s(H))$. In FIG. 3, $g(\nu - \nu_s(H))$ is shown approximately in a rectangular shape having a width of $\Delta\nu$.

The transmittance $T(\nu)$ is given by the following expression:

$$T(\nu) = 1 - \frac{\int_{-\infty}^{\infty} f(\nu)[1 - \exp\{-g(\nu - \nu_s(H))\}]d\nu}{\int_{-\infty}^{\infty} f(\nu)d\nu} \tag{2}$$

Logarithmic transformation of the above expression provides the following relation in linear approximate expression:

$$\log T(\nu) = \tag{3}$$

$$\frac{-f(\nu_s(H)) \int_{\nu_s(H) - \frac{1}{2}\Delta\nu}^{\nu_s(H) + \frac{1}{2}\Delta\nu} 1 - \exp\{-g(\nu - \nu_s(H))\}d\nu}{\int_{-\infty}^{\infty} f(\nu)d\nu}$$

$$\propto f(\nu_s(H))$$

Thus, logarithmic transformation of the transmittance provides directly the profile of the emission line spectrum.

Figure 4:
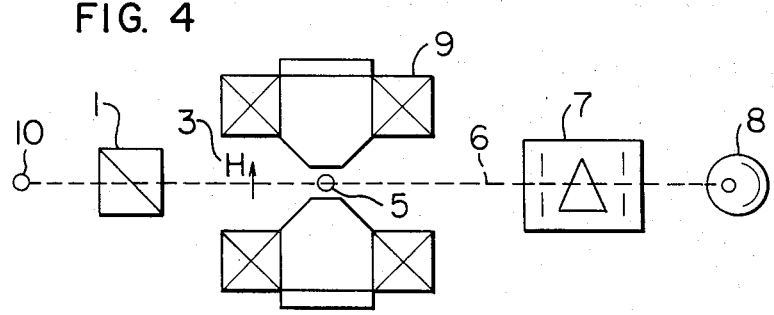
FIG. 4 shows schematically the structure of another preferred embodiment of the present invention.

FIG. 4 shows schematically the structure of another embodiment of the present invention and, in this apparatus, the lateral inverse Zeeman effect is utilized. Referring to FIG. 4 in which like reference numerals are used to designate like parts appearing in FIG. 1, light emitted from a light source 10 such as a hollow cathode lamp is incident upon a linear polarizer 1 which decomposes the incident light into a linearly polarized light component which is perpendicular or parallel to a magnetic field 3 applied by an electromagnet 9 establishing a magnetic field of variable intensity. In the arrangement shown in FIG. 4, the magnetic field 3 is applied to an absorbing cell 5 in a direction perpendicular to the light beam 6.

As described hereinbefore, the primary resonance line of Zn exhibits the normal Zeeman effect. In such a case, the polarized light component perpendicular to the applied magnetic field is used to observe absorption by the $\sigma^\pm$ components. In the method shown in FIG. 4, absorption of the emission line by the $\sigma^+$ and $\sigma^-$ components shifted symmetrically relative to the wavelength at the magnetic field of zero intensity is observed, and therefore there is such a restriction that the profile of the emission line spectrum subjected to measurement must be symmetrical on both sides of the wavelength at the magnetic field of zero intensity. On the other hand, however, the structure of the apparatus and the process of measurement can be quite simplified, since the phase-shifting plate or wave plate 2 shown in FIG. 1 is unnecessary, and the electromagnet 9 need not be provided with the through-hole used for measurement. The method shown in FIG. 4 is convenient in that the profile of a line spectrum emitted from an atomic-spectrum light source is symmetrical when the spectral line is free from the hyperfine structure.

In the case of measurement of the Zn's resonance line having the wavelength of 213.9 nm, the width of the absorption spectrum line is dependent only on the Doppler broadening and is 2.5 GHz at 150° C. This means that the resolution in this case is as high as 50,000. Since the resolution can be further increased by narrowing the width of the absorption spectrum line, an absorbing cell utilizing an atomic beam may be used for that purpose.

Although, in the case of measurement of an emission spectrum line exhibiting the abnormal Zeeman effect, branches of the $\sigma$ component may complicate the situation, the profile of the emission line spectrum can be accurately determined by the use of a computer.

Also, the profile of the emission line spectrum can be accurately determined by correcting the width of the absorption spectrum line by computing the deconvolution utilizing a computer.

Figure 5:
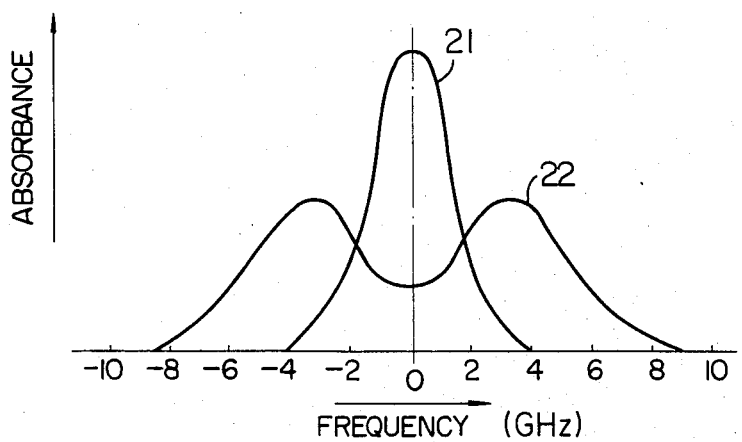
FIG. 5 is a graph showing the result of actual measurement on the line spectrum emitted from zinc.

FIG. 5 shows the data obtained as a result of actual measurement of the profile of the line spectrum emitted from the Zn hollow cathode lamp according to the method employed in the embodiment shown in FIG. 4. The primary resonance line (213.9 nm) of Zn has an extremely large absorption intensity, and the self-absorption of the light source has posed a problem. In addition, because of the very short wavelength, there have been no methods for measuring the profile, and the profile has not been measured up to now. Referring to FIG. 5, the emission line spectrum of Zn is represented by a Gaussian profile 21 when the value of lamp current is 1.5 mA, and it will be seen that a marked self-inversion takes place as shown by the profile 22 when the value of lamp current is increased to 10 mA. Since such a lamp has generally been supplied with lamp current of 10 mA when used for the atomic absorption analysis, a greatly self-inverted emission line spectrum has been used hitherto for the analysis.

It has been pointed out that the sensitivity of absorption and the linearity of calibration curve, which indicates the relationship between the concentration of component to be measured and the light intensity as detected, are degraded depending on the lamp, method of lamp energization or lamp current in the case of the hollow cathode lamp of, for example, Zn or Cd. In this connection, the experimental result shown in FIG. 5 has clarified that the degradation of the sensitivity and linearity results from the self-inversion of the emission line spectrum. It can thus be expected that the apparatus according to the present invention can also be advantageously used for the quality control of such hollow cathode lamps.

Besides the aforementioned advantages, the embodiments of the present invention shown in FIGS. 1 and 4 provide other advantages as enumerated below:

(a) The wavelength of an absorption spectrum line in a magnetic field of zero intensity is peculiar to a specific atom. Therefore, the accuracy of wavelength measurement is very high and stable.

(b) The intensity of light after absorption is very high compared with the Fabry-Perot interferometer. Therefore, light of very low intensity can even be satisfactorily spectroscopically analyzed with high resolution.

(c) The apparatus is simpler in construction and can be more easily handled than the Fabry-Perot interferometer.

(d) Resonance lines in the ultraviolet range can also be measured under vacuum when a synthetic quartz crystal is used as the material of the polarizer and cell.

In the embodiment of the present invention shown in FIG. 1, the profile of an emission line spectrum from a light source is measured by directing objective light in a direction parallel to a magnetic field established by an electromagnet, varying the intensity of the magnetic field to shift the wavelength of the $\sigma^+$ or $\sigma^-$ component split from an absorption spectrum line of atomic vapor, and scanning independently the $\sigma^+$ or $\sigma^-$ component along the wavelength of the emission line spectrum.

In the embodiment shown in FIG. 4, the profile of a symmetrical emission line spectrum is measured by directing objective light from a light source in a direction perpendicular to a magnetic field established by an electromagnet, varying the intensity of the magnetic field to shift the wavelength of the $\pi$ or $\sigma$ component Zeeman-branched from an absorption spectrum line of atomic vapor, and scanning one of the $\pi$ and $\sigma$ components along the wavelength of the emission line spectrum.

The width of the absorption line of the atomic vapor emitted from the material enclosed in the absorbing cell is smaller than that of the emission line spectrum from the atomic-spectrum emitting light source. Therefore, the profile of the emission line spectrum can be depicted by recording the absorbance at each individual wavelength measured during wavelength scanning.

I claim:

1. An apparatus capable of measuring the profile of an emission line spectrum comprising:

light emitting means for emitting a line spectrum whose profile is to be measured;

magnetic field establishing means for establishing a variable-intensity magnetic field on an optical path extending from said light emitting neans, the direction of said magnetic field being parallel to said optical path;

polarizing means for selectively transmitting linearly polarized light disposed between said light emitting means and said magnetic field establishing means;

means for varying the phase of said linearly polarized light disposed between said polarizing means and said magnetic field establishing means;

absorption line producing means disposed in said magnetic field, said absorption line producing means including means for enclosing an element producing an absorption line of the wavelength substantially the same as that of the emission line and maintained at a predetermined atomic vapor pressure, the width of said absorption line in wavelength being smaller than that of said emission line spectrum;

means for shifting the wavelength of a component split from said absorption line by varying the intensity of said magnetic field while the light from said light emitting means is being directed toward said absorption line producing means, and scanning said wavelength-shifted component along the wavelength of the profile of said emission line spectrum;

detecting means responsive to said waveform shifting means for detecting the light transmitted through said absorption line producing means; and monochromatic means disposed between said absorption line producing means and said detecting means.

2. An apparatus as claimed in claim 1, wherein said absorption line producing means includes a cell of quartz enclosing said element and an inert gas therein.

3. An apparatus as claimed in claim 2, wherein said quartz cell is controlled to be maintained at a predetermined temperature.

4. An apparatus as claimed in claim 1, wherein said light emitting means includes a hollow cathode lamp which is detachably mounted for replacement.

5. An apparatus as claimed in claim 1, wherein said magnetic field establishing means includes an electromagnet.

6. An apparatus as claimed in claim 1, wherein said means for varying the phase of said linearly polarized light provides for one of right circularly polarized light and left circularly polarized light.

7. An apparatus capable of measuring the profile of an emission spectrum comprising:

light emitting means for emitting a line spectrum whose profile is to be measured, said light emitting means being detachably mounted for replacement;

magnetic field establishing means for establishing a magnetic field on an optical path extending from said light emitting means, the direction of said magnetic field being perpendicular to said optical path;

absorbing cell means disposed in said magnetic field, said absorbing cell means enclosing an element producing an absorption line of the wavelength substantially the same as that of the emission line spectrum, the width of said absorption line in wavelength being smaller than that of said emission line spectrum;

means for shifting the wavelength of a component split from said absorption line by varying the intensity of said magnetic field while the light from said light emitting means is being directed toward said absorbing cell means, and scanning said wavelength-shifted component along the wavelength of the profile of said emission line spectrum;

means disposed between said light emitting means and said absorbing cell means for transmitting a linearly polarized component of the light emitted from said light emitting means, the polarizing plane of said component being perpendicular to said magnetic field;

means responsive to said wavelength shifting means for detecting light transmitted through said absorbing cell means; and monochromatic means disposed between said absorbing cell means and said light detecting means.

8. An apparatus as claimed in claim 7, wherein said enclosed element is a metal, and said absorbing cell means is controlled to be maintained at a predetermined temperature.

9. An apparatus as claimed in claim 8, wherein said enclosed element is maintained within said absorbing cell means at a vapor pressure of between $10^{-5}$ to $10^{-3}$ Torr.

* * * * *